(12) United States Patent
Ogawa et al.

(10) Patent No.: US 8,857,897 B2
(45) Date of Patent: Oct. 14, 2014

(54) LIGHT-LOAD ABSORBING STRUCTURE

(75) Inventors: Masayuki Ogawa, Wako (JP); Hiroyuki Hazawa, Wako (JP); Takenobu Haga, Wako (JP); Keiichi Honda, Wako (JP); Takashi Yamanaka, Wako (JP); Ryuichi Murai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/614,009

(22) Filed: Sep. 13, 2012

(65) Prior Publication Data

US 2013/0076070 A1 Mar. 28, 2013

(30) Foreign Application Priority Data

Sep. 27, 2011 (JP) .................................. 2011-210996

(51) Int. Cl.
*B60R 19/34* (2006.01)
*B60R 19/18* (2006.01)

(52) U.S. Cl.
CPC ......... *B60R 19/34* (2013.01); *B60R 2019/1886* (2013.01)
USPC ...................... 296/187.11; 296/191; 293/133

(58) Field of Classification Search
USPC ............. 296/187.03, 187.09, 187.11, 203.04, 296/146.6, 146.8, 50, 29, 193.08, 193.09, 296/1.08, 191; 293/131, 132, 133; 49/502
See application file for complete search history.

(56) References Cited

U.S. PATENT DOCUMENTS

| | | | | |
|---|---|---|---|---|
| 4,109,899 A | * | 8/1978 | Takatsu | 267/140 |
| 6,197,403 B1 | * | 3/2001 | Brown et al. | 428/137 |
| 6,676,187 B1 | * | 1/2004 | Miskech et al. | 296/50 |
| 7,097,235 B2 | * | 8/2006 | Yasukouchi et al. | 296/187.03 |
| 7,357,432 B2 | * | 4/2008 | Roll et al. | 293/133 |
| 8,104,825 B2 | * | 1/2012 | Stadtherr | 296/155 |
| 2008/0098601 A1 | * | 5/2008 | Heinz et al. | 29/897.2 |
| 2009/0102235 A1 | * | 4/2009 | Ajisaka | 296/187.03 |
| 2011/0291431 A1 | * | 12/2011 | Buschsieweke et al. | 293/133 |
| 2012/0323447 A1 | * | 12/2012 | Niesse et al. | 701/45 |

FOREIGN PATENT DOCUMENTS

| | | |
|---|---|---|
| JP | 11-059493 A | 3/1999 |
| JP | 2003-306095 A | 10/2003 |
| JP | 2007-176359 A | 7/2007 |

OTHER PUBLICATIONS

Japanese Office Action dated Aug. 27, 2013, issued in corresponding Japanese Patent application No. 2011-210996.

* cited by examiner

*Primary Examiner* — Pinel Romain
(74) *Attorney, Agent, or Firm* — Westerman, Hattori, Daniels & Adrian, LLP (57) ABSTRACT

A lower garnish arranged adjacent to the lower part of a tailgate includes a surface portion extending along an outer surface of an outer panel and a mounting portion disposed between the outer surface of the outer panel and an inner surface of the surface portion. The mounting portion includes a mounting seat extending along the outer surface of the outer panel and being mounted on the outer panel and a connecting wall connecting the mounting seat and the surface portion. The connecting wall has a first slit extending along a first direction directing from the surface portion toward the mounting seat and a second slit intersecting the first slit at right angles.

12 Claims, 8 Drawing Sheets

LIGHT-LOAD ABSORBING STRUCTURE

CROSS REFERENCES TO RELATED APPLICATIONS

The present application claims priority under 35 U.S.C. §119 to Japanese Patent Application No. 2011-210996, filed Sep. 27, 2011, entitled "Light-Load Absorbing Structure." The contents of this application are incorporated herein by reference in their entirety.

TECHNICAL FIELD

The present application relates to a light-load absorbing structure capable of satisfactorily absorbing a light load applied to a vehicle.

BACKGROUND

Japanese Unexamined Patent Application Publication No. 2007-176359 (hereinafter referred to as Patent Literature 1) discloses a structure in which a mounting seat portion having a substantially box shape is disposed for a lower garnish mounted to the lower end of a tailgate of a vehicle rear portion and the lower garnish is mounted on an outer panel of the tailgate with a clip engaged with the mounting seat portion.

Japanese Unexamined Patent Application Publication No. 2003-306095 (hereinafter referred to as Patent Literature 2) discloses a bumper mounting structure in which a bumper reinforcement in a bumper at the front of the vehicle is mounted on each of bumper stays of side members using a positioning bolt disposed on a mounting seat and protruding toward the front of the vehicle as a positioning unit in the vehicle width direction for the bumper reinforcement, a pair of semicircular left and right slits as a weak unit are disposed around the positioning bolt, and a pair of top and bottom bridges each having a narrow plate-like shape are disposed between the top opposed ends and between the bottom opposed ends of the pair of left and right slits.

When a vehicle is hit by another vehicle from behind the tailgate, in particular, when that collision is small enough to be within a stroke of from the surface of the lower garnish to the surface of the outer panel, if the member receiving the impact load can be limited to only the lower garnish, the necessity of a steel-metal repair or other suitable repairs of the outer panel can be eliminated and this can reduce the burdens on the user.

For example, in the lower-garnish mounting structure disclosed in Patent Literature 1, the mounting seat portion on which the clip is disposed and the outer panel are adjacent to each other. Accordingly, if the rigidity between the surface (design surface) of the lower garnish and the mounting seat portion (side wall forming the mounting seat portion) is high, the mounting seat portion may be displaced by the same amount as the amount of displacement (the amount of deformation) of the surface of the lower garnish in a collision, the surface of the outer panel may be pressed by the mounting seat portion, which is adjacent to the outer panel, and the outer panel may be deformed. In contrast to this, if the rigidity between the surface of the lower garnish and the mounting seat portion is set low, the lower garnish may be deformed by, for example, merely a press on the surface of the lower garnish by a user with a finger, and this may raise another issue of a decrease in the marketability of the lower garnish.

A hypothetical possible approach to addressing the above-described issues is a structure in which the structure disclosed in Patent Literature 2 is applied to a lower garnish and a slit is formed around the clip seat of the lower garnish.

The structure disclosed in Patent Literature 2 is a structure that can be applied when the bumper reinforcement is displaced in the direction extending along the surface of the mounting seat of the bumper stay (direction perpendicular to the axis of the positioning bolt). Thus it is difficult to apply the structure disclosed in Patent Literature 2 to the case where a vehicle is displaced in the direction perpendicular to the surface of the outer panel and the mounting seat portion (direction along the axis of the clip) when the vehicle is hit by another vehicle from behind.

That is, the structure that is arranged in the front of a vehicle and that absorbs displacement of the bumper reinforcement by a load input in the vehicle width direction and the structure that is arranged in the back of a vehicle and that absorbs displacement of the lower garnish by a load input from the back of the vehicle toward the front of the vehicle (toward the outer panel) are essentially different in the direction of the applied load. Thus, it is difficult to apply the load absorbing structure disclosed in Patent Literature 2 to the mounting portion of the lower garnish for the outer panel.

SUMMARY

The present application describes a light-load absorbing structure capable of absorbing (buffering) a light load when the light load is applied to a decorative member mounted on an outer panel and suppressing deformation of the outer panel.

A light-load absorbing structure according to an aspect of the embodiments includes an outer panel and a decorative member. The outer panel forms an external surface of a vehicle. The decorative member is arranged outside the outer panel in the vehicle and mounted on the outer panel. The decorative member includes a surface portion and a mounting portion, the surface portion being spaced apart from the outer panel in an inward and outward direction of the vehicle and extending along an outer surface of the outer panel, the mounting portion being disposed between the outer surface of the outer panel and an inner surface of the surface portion. The mounting portion includes a mounting seat and a connecting wall, the mounting seat extending along the outer surface of the outer panel and being mounted on the outer panel, the connecting wall connecting the mounting seat and the surface portion. The connecting wall includes a first slit and a second slit, the first slit extending from a side adjacent to the surface portion toward a side adjacent to the mounting seat, the second slit intersecting the first slit.

According to the aspect of the embodiments, while the surface portion is displaced in the direction in which it becomes closer to the outer panel in response to the application of a light load to the surface portion at the time of a light collision, the connecting wall is deformed in the direction in which the slit width of the first slit at the intersection increases and is also deformed in the direction in which the slit width of the second slit at the intersection decreases.

Thus, according to the aspect of the embodiments, the connecting wall can become easily deformed through the first slit and the second slit, which intersect each other, and the light load can be absorbed, and the transmission of the light load to the outer panel can be reduced and the deformation of the outer panel can be suppressed. As a result, in the aspect of the embodiments, when a light load is applied to the decorative member in a light collision, replacement with a new decorative member is merely required and the necessity of a steel-metal repair or other suitable repairs of the outer panel can be eliminated, and thus burdens on a user can be reduced.

In the aspect of the embodiments, "slit" includes a hole that passes through the front and back surfaces of the connecting wall and that is not opened at both ends extending along its extending direction.

In the aspect of the embodiments, the first slit and the second slit may intersect each other at right angles.

According to the aspect of the embodiments, the first slit and the second slit intersecting at right angles enable the first slit to become deformed in the direction in which its own slit width increases without becoming deformed on only one side when a light load is applied. In addition, in the aspect of the embodiments, situations in which, of the two parts divided by the first slit in the direction from the surface portion toward the mounting seat, only one part comes into contact with the outer panel in advance of the other part can be reduced.

In the aspect of the embodiments, the second slit may have a substantially wedge shape in which a slit width of the second slit gradually increases toward the first slit.

According to the aspect of the embodiments, the substantially wedge shape can ensure a sufficient amount of deformation of the second slit at the intersection in the direction in which the slit width decreases. In the aspect of the embodiments, the substantially wedge shape enables a part of the connecting wall that contains the second slit to be deformed in the direction in which it becomes apart from the first slit.

In the aspect of the embodiments, the "substantially wedge shape" includes a shape that approximates to a triangle with sides closing in a nearly V shape.

In the aspect of the embodiments, the second slit may be arranged in a substantially central part in the connecting wall in a direction from the surface portion toward the mounting seat.

According to the aspect of the embodiments, the amount of deformation occurring when the connecting wall is deformed with the second slit serving as the center can be maximized.

In the aspect of the embodiments, the connecting wall may include a recess extending in an extending direction of the second slit.

According to the aspect of the embodiments, the connecting wall can be bent at the recess as the base point when a light load is applied, and the connecting wall can be deformed with reliability.

In the aspect of the embodiments, the connecting wall may include a side edge and a cut in the side edge, the cut extending along an extending direction of the recess.

According to the aspect of the embodiments, because deformation from the recess as the base point can be facilitated by the cut, the connecting wall is deformable with more reliability.

In the aspect of the embodiments, the connecting wall may have an open cross section formed by a first wall portion, a second wall portion, and a third wall portion, the second wall portion and the third wall portion extending from respective opposite ends of the first wall portion, being spaced apart from each other at a predetermined distance, and facing each other, and the first slit and the second slit may be disposed in the first wall portion.

In that case, the open cross section may be at least any one of a rectangular U-shaped cross section, a rounded U-shaped cross section, and a semicircular cross section.

According to the aspect of the embodiments, the open cross section formed by the second wall portion and the third wall portion extending from respective opposite ends of the first wall portion and facing each other at a predetermined distance can ensure a minimum rigidity at which the decorative member is not deformed by merely a press on the surface portion by a user with a finger and can avoid a decrease in the marketability of the decorative member. In addition, in the aspect of the embodiments, while the minimum rigidity is ensured, the second wall portion and the third wall portion can be bent by deformation of the first wall portion and the entire connecting wall can be easily deformed in a light collision.

In the aspect of the embodiments, the decorative member may include a side wall portion extending from the surface portion toward the outer panel, and the connecting wall may include a spaced portion and a base, the spaced portion extending from the mounting seat toward the surface portion and facing the side wall portion such that a gap is disposed therebetween, the base connecting the spaced portion and the surface portion.

According to the aspect of the embodiments, because the gap is disposed between the side wall portion and the spaced portion, the side wall portion is not an obstruction to deformation of the connecting wall, and the side wall portion can be prevented from interfering with the deformation of the connecting wall. In addition, according to the aspect of the embodiments, connecting the side wall portion and the spaced portion with the base in a region adjacent to the surface portion can enhance the rigidity in the region adjacent to the surface portion, enable a light load to be efficiently transmitted to the spaced portion, and enable the spaced portion to be easily deformed.

In the aspect of the embodiments, the connecting wall may include a third slit, the third slit being adjacent to a junction of the spaced portion and the base and extending between the first slit and the junction.

According to the aspect of the embodiments, the region having the rigidity increased by the base can be efficiently deformed by the third slit, which is adjacent to the junction of the spaced portion and the base.

BRIEF DESCRIPTION OF THE DRAWINGS

The advantages of the disclosure will become apparent in the following description taken in conjunction with the following drawings.

DETAILED DESCRIPTION

Figure 1:
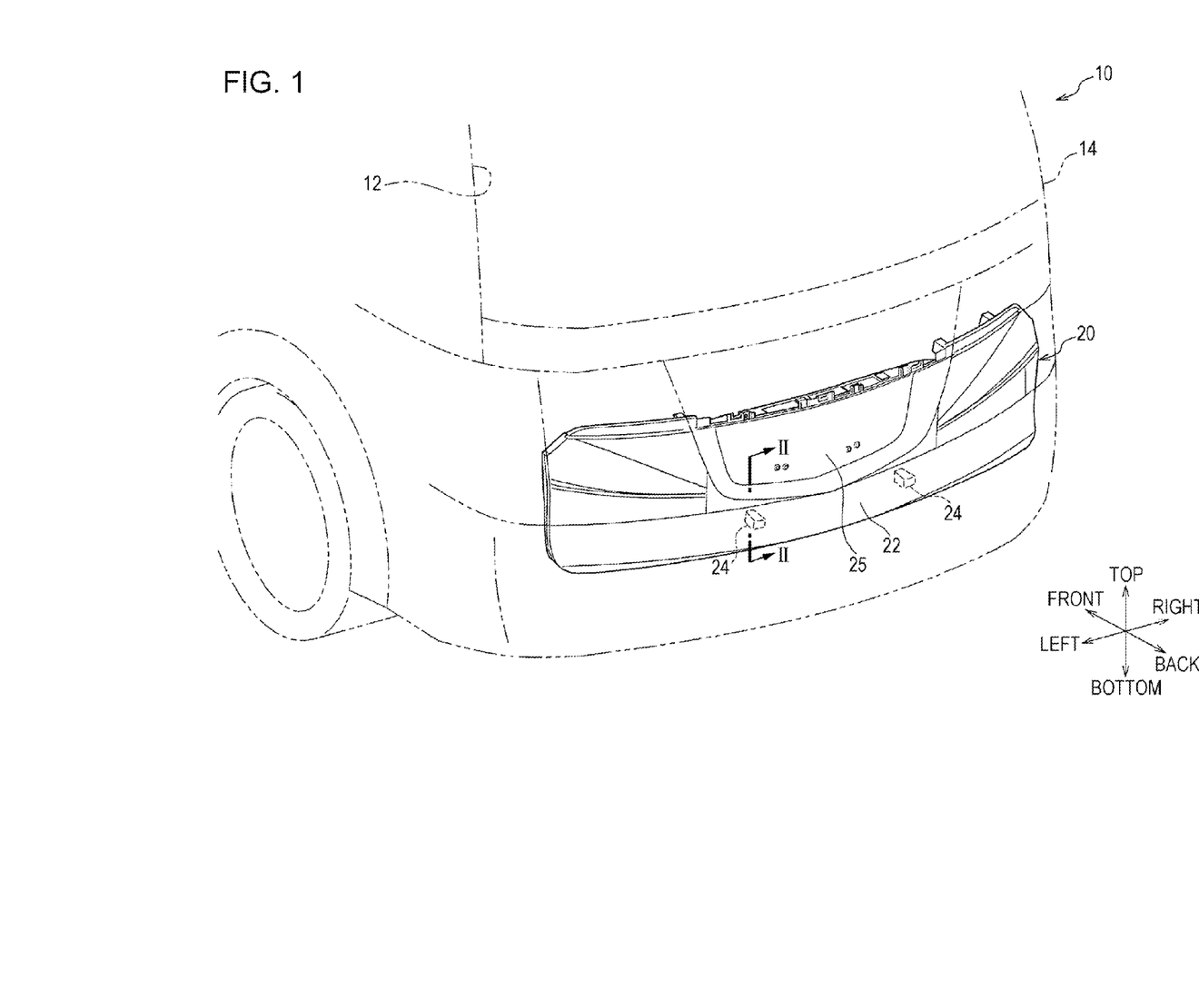
FIG. 1 is a perspective view of the back of a vehicle that uses a light-load absorbing structure according to an embodiment.
Figure 2:
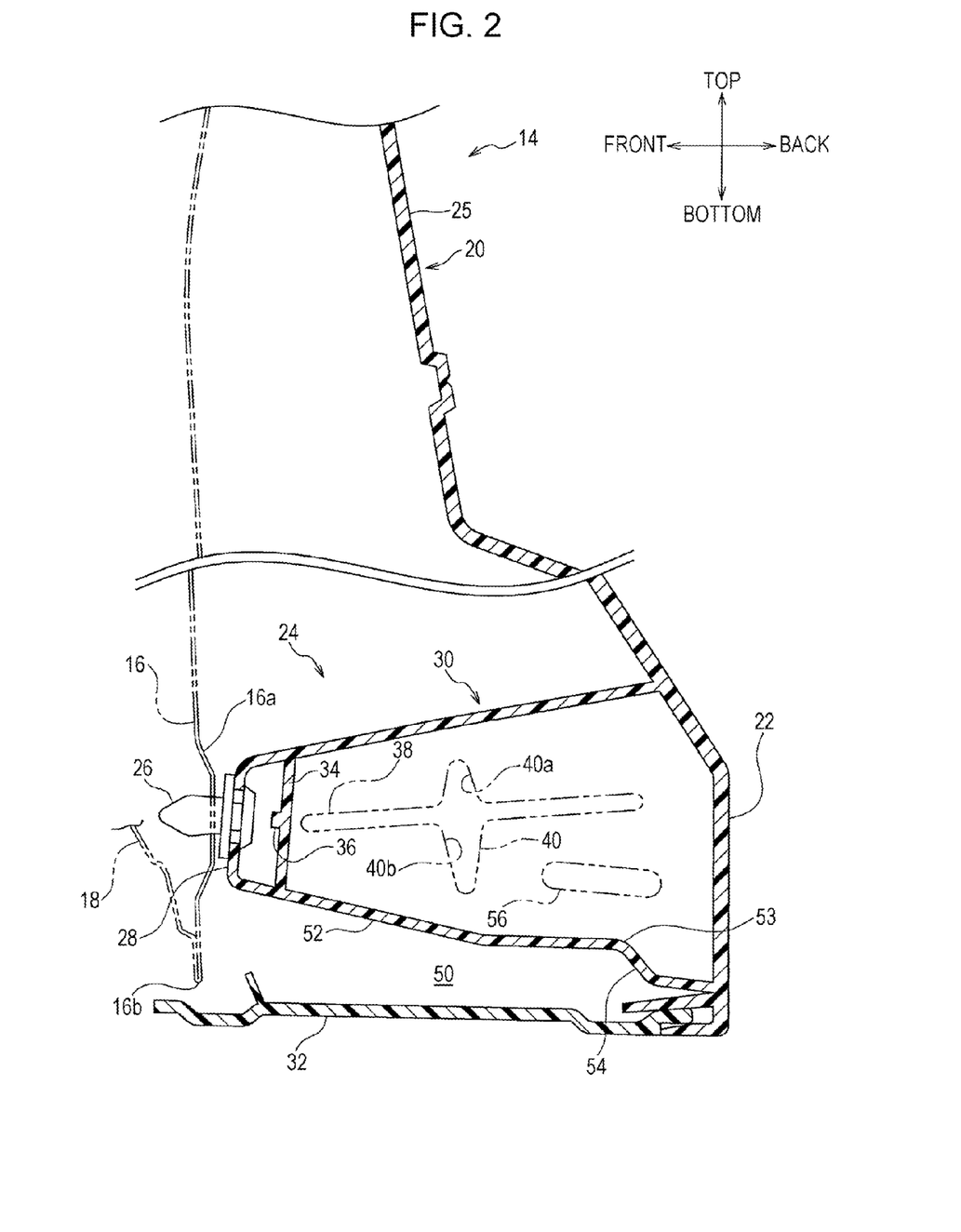
FIG. 2 illustrates a longitudinal section of a lower garnish taken along the line II-II in FIG. 1.

The embodiments are described below with reference to the drawings when appropriate. FIG. 1 is a perspective view of the back of a vehicle that uses a light-load absorbing structure according to an embodiment. FIG. 2 illustrates a longitudinal section of a lower garnish taken along the line II-II in FIG. 1.

As illustrated in FIG. 1, a tailgate opening 12 is disposed at the back of the body of a vehicle 10, and a tailgate 14 for opening and closing the tailgate opening 12 by pivoting about a hinge (not illustrated) is disposed. In the drawings, the "front and back" and "top and bottom" arrows indicate the front and back direction and the top and bottom direction of the vehicle body, respectively, and the "left and right" arrows indicate the left and right direction from the driver's seat.

The tailgate 14 includes a panel formed from a frame unit (not illustrated) made of a steel sheet, and the panel includes an outer panel 16 forming the external surface of the vehicle 10 and an inner panel 18 disposed inside the outer panel 16, as illustrated in FIG. 2. The outer panel 16 and the inner panel 18 are integrally joined at their portions containing their respective lower end by hemming or other suitable process.

A lower garnish 20 is disposed adjacent to the lower part of the tailgate 14. The lower garnish 20 can be made of a resin material, for example. The lower garnish 20 functions as a decorative member, is arranged outside the outer panel 16 in the vehicle, and is mounted and fixed on the outer panel 16.

As illustrated in FIG. 2, the lower garnish 20 includes a surface portion 22 and a mounting portion 24. The surface portion 22 is spaced apart from the outer panel 16 in the inward and outward direction of the vehicle, extends along an outer surface 16a of the outer panel 16, and includes a design surface. The mounting portion 24 is disposed between the outer surface 16a of the outer panel 16 and the surface portion 22. A license plate placing portion 25 on which a license plate (not illustrated) can be placed is disposed in the upper portion of the surface portion 22.

As illustrated in FIG. 1, the two mounting portions 24 are provided along the vehicle width direction (left and right direction). The embodiments are not limited to this arrangement. Alternatively, for example, only one mounting portion 24 may be provided in the central part in the vehicle width direction, or more than two mounting portions 24 may be provided at predetermined distances along the vehicle width direction.

Figure 3:
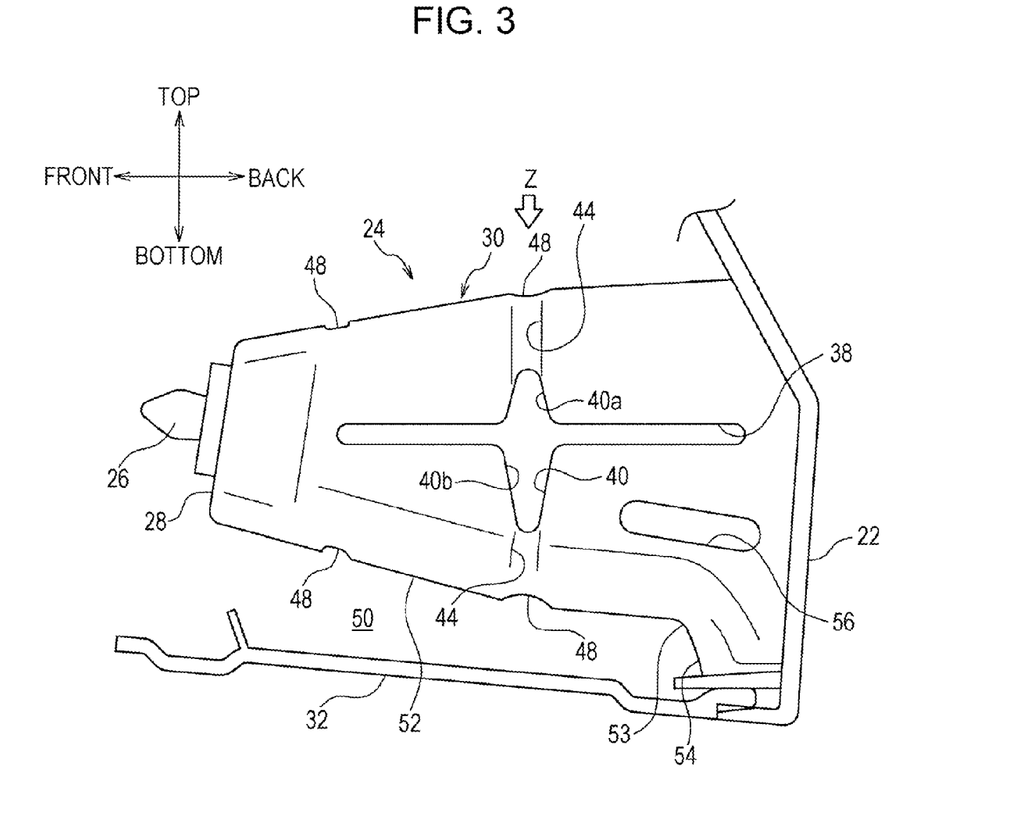
FIG. 3 is a side view of a connecting wall containing a side wall portion.
Figure 4:
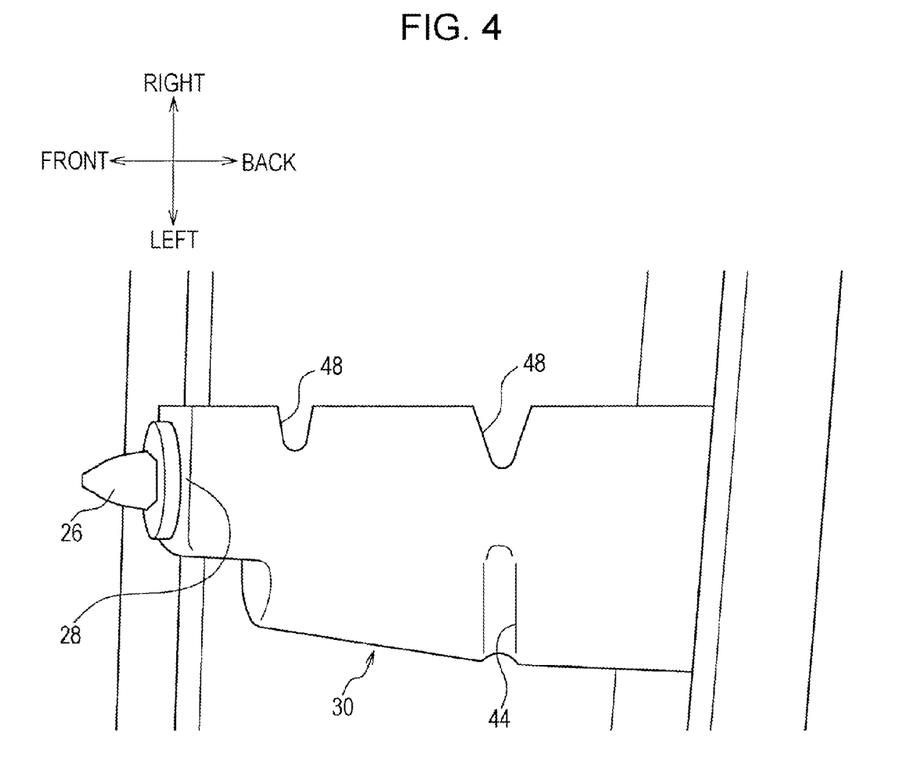
FIG. 4 is an illustration viewed from the direction of the arrow Z illustrated in FIG. 3.
Figure 5A:
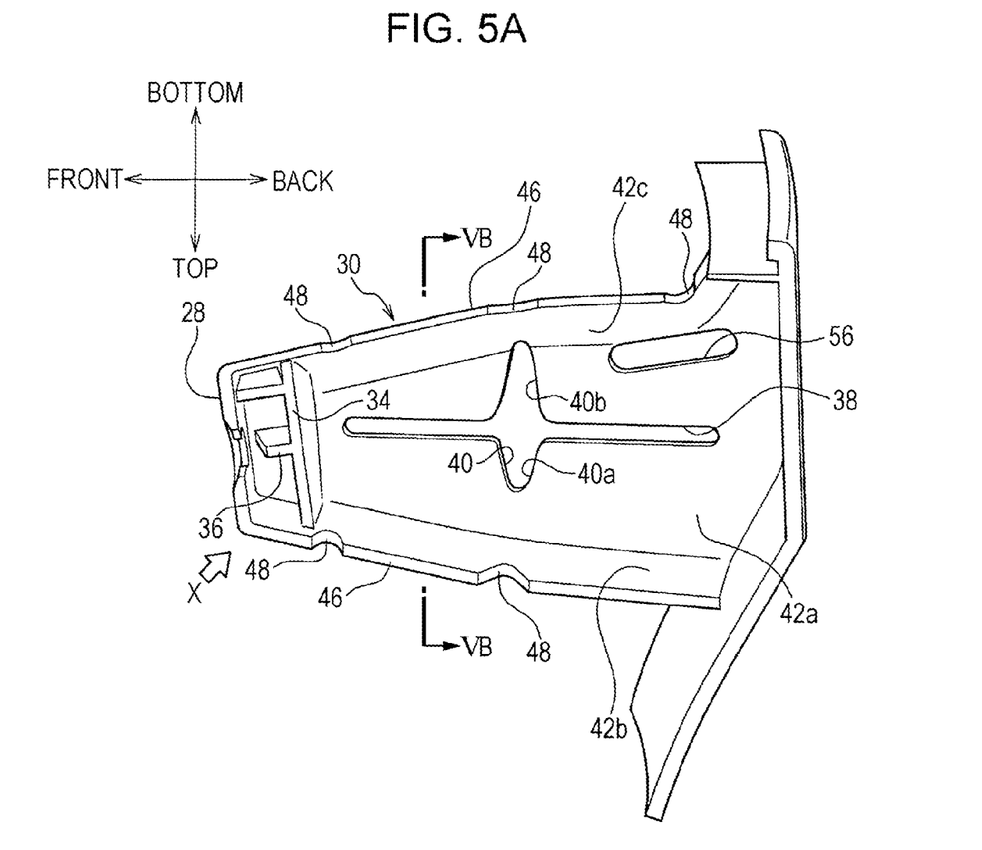
FIG. 5A is a rear view of the connecting wall.
Figure 5B:
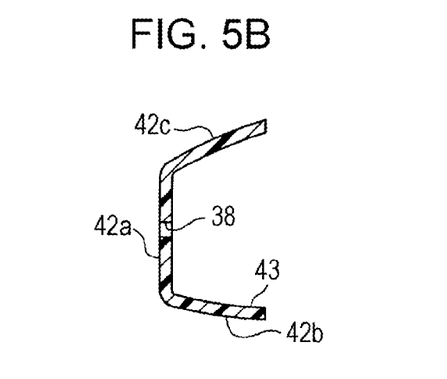
FIG. 5B illustrates a longitudinal section taken along the VB-VB in FIG. 5A.
Figure 6:
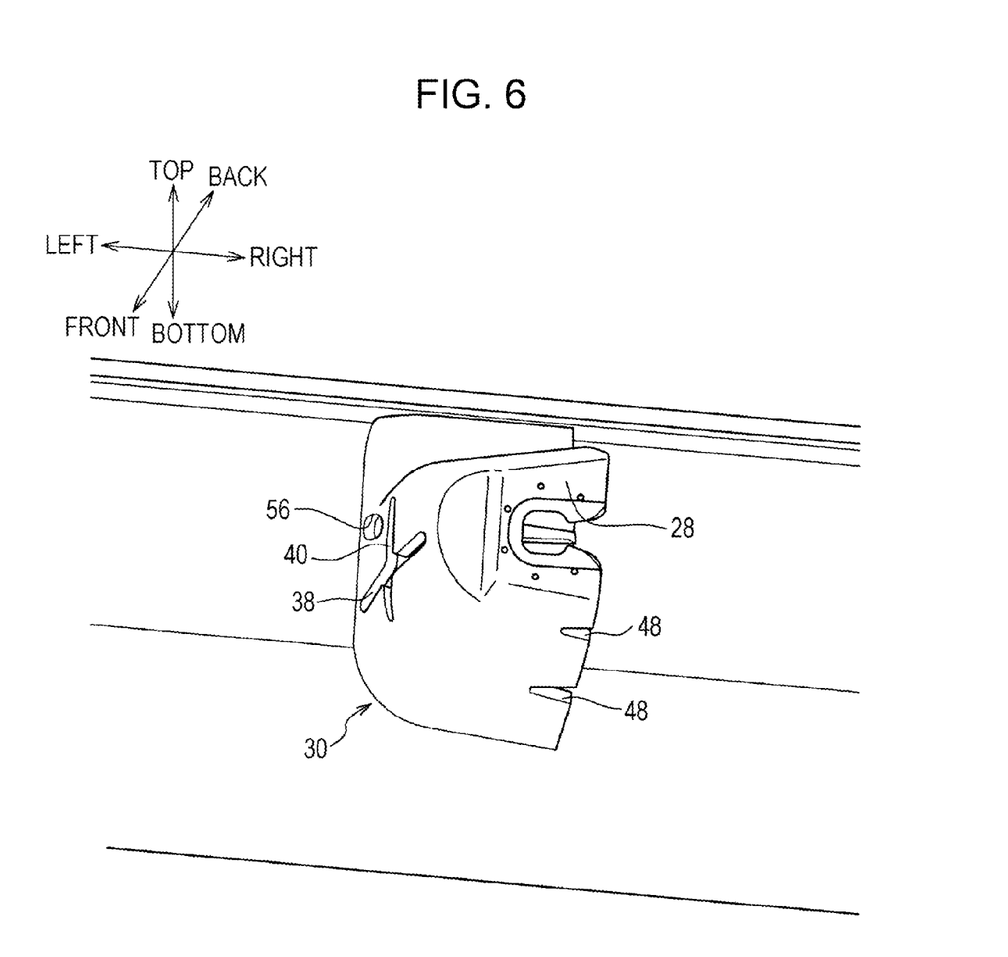
FIG. 6 is an illustration viewed from the direction of the arrow X illustrated in FIG. 5A.

FIG. 3 is a side view of a connecting wall containing a side wall portion. FIG. 4 is an illustration viewed from the direction of the arrow Z illustrated in FIG. 3. FIG. 5A is a rear view of the connecting wall, and FIG. 5B illustrates a longitudinal section taken along the VB-VB in FIG. 5A. FIG. 6 is an illustration viewed from the direction of the arrow X illustrated in FIG. 5A.

Each of the mounting portions 24 includes a mounting seat 28 and a connecting wall 30. The mounting seat 28 extends along the outer surface 16a of the outer panel 16 and is mounted on the outer panel 16 with a mounting element 26 made of a metal or resin. The connecting wall 30 connects the mounting seat 28 and the surface portion 22. A side wall portion 32 is disposed below the mounting portion 24. The side wall portion 32 is spaced apart from the connecting wall 30 and extends from the surface portion 22 toward the outer panel 16. The rigidity and strength of the mounting portion 24 are set lower than those of the outer panel 16. The mounting portion 24 is made of a material that can be deformed more easily than the material of the outer panel 16 (e.g., a resin material or aluminum).

The mounting seat 28 is adjacent to a partition 34 extending substantially in parallel with the seat surface of the mounting seat 28. The partition 34 enables the mounting seat 28 mounted on the outer panel 16 to have a predetermined coupling strength. The partition 34 includes a protrusion 36 protruding toward the mounting seat 28 (see FIGS. 2 and 5A).

As illustrated in FIG. 5A, the connecting wall 30 includes a first wall portion 42a, a second wall portion 42b, and a third wall portion 42c. The first wall portion 42a is wide and has a first slit 38 and a second slit 40. The second wall portion 42b and the third wall portion 42c are bent (extend) from respective opposite ends of the first wall portion 42a in the direction perpendicular to the axis of the first wall portion 42a, are spaced apart from each other at a predetermined distance, and face each other. In this case, the connecting wall 30 has an opening 43 (see FIG. 5B) between the second wall portion 42b and the third wall portion 42c and has an open cross section that is opened in one direction.

As illustrated in FIG. 5B, in the present embodiment, the open cross section has a substantially rectangular U shape. The embodiments are not limited to this shape. The open cross section may be a rounded U-shaped cross section, a semicircular cross section, or an arc cross section.

The first wall portion 42a of the connecting wall 30 has the first slit 38 and the second slit 40. The first slit 38 extends from the side adjacent to the surface portion 22 toward the side adjacent to the mounting seat 28 in a substantially horizontal direction. This direction may be the front-rear direction of the vehicle 10. The first slit 38 and the second slit 40 intersect each other at right angles or at substantially right angles.

The second slit 40 includes an upper second slit 40a and a lower second slit 40b. The upper second slit 40a and the lower second slit 40b start from the intersection of the second slit 40 and the first slit 38. The silt length, which is the length of a slit in its extending direction, of the lower second slit 40b is set longer than that of the upper second slit 40a.

Each of the upper second slit 40a and the lower second slit 40b has a substantially wedge shape in which its slit width (the width of the gap between the opposed inner walls) gradually increases toward the intersection with the first slit 38. The "substantially wedge shape" indicates a shape that approximates to a triangle with sides closing in a nearly V shape.

The second slit 40 may be disposed in a location other than the central part in the slit length of the first slit 38. The second slit 40 is located in a substantially central part in the direction from the surface portion 22 of the connecting wall 30 toward the mounting seat 28, the substantially central part being in between a first end and a second end of the first wall portion 42a along its axial direction.

The connecting wall 30 includes recesses 44 extending along the extending direction of the second slit 40. In this case, as illustrated in FIG. 3, the recesses 44 are continuous with (connected to) the upper second slit 40a and the lower second slit 40b, respectively. Alternatively, the recesses 44 may be spaced apart from the upper second slit 40a and the lower second slit 40b if they extend in the same direction as the extending direction of the upper second slit 40a and the lower second slit 40b.

The connecting wall 30 includes a cut 48 in a side edge 46 of each of the second wall portion 42b and the third wall portion 42c of the connecting wall 30 (see FIG. 4). Each of the cuts 48 extends toward the recess 44 when seen in plan view and extends so as to have a substantially V shape in the extending direction of the recess 44. The cut 48 may or may not reach the end of the recess 44. To facilitate deformation of the connecting wall 30, other cuts 48 are disposed in a region in the side edge 46 other than the region in the extending direction of the recess 44 (see FIG. 5A).

Referring back to FIG. 2, the connecting wall 30 further includes a spaced portion 52 and a base 54. The spaced portion 52 extends from the mounting seat 28 toward the surface portion 22 and faces the lower side wall portion 32 such that a gap 50 is disposed therebetween. The base 54 connects the spaced portion 52 and the surface portion 22. A bent junction 53 is disposed between the spaced portion 52 and the base 54. The junction 53 is adjacent to a third slit 56 (see FIG. 3). The third slit 56 is substantially oval and is disposed between the first slit 38 and the junction 53. The spaced portion 52 is the same as the third wall portion 42c illustrated in FIG. 5A.

In that case, the side wall portion 32 is positioned below a lower end 16b (see FIG. 2) of the outer panel 16 in the top and bottom direction. This respect will be described later.

In the present embodiment, each of the first to third slits 38, 40, and 56 is a hole (long hole) that passes through the front and back surfaces of the first wall portion 42a of the connecting wall 30 and that is not opened at both ends extending along the slit length, as illustrated in FIGS. 2, 3, 5A and 5B, and 6. For example, the slit may be an elongated through hole. However, the shape of the hole is not limited to the elongated hole as described above.

The fundamental configuration of the vehicle 10 using the light-load absorbing structure according to the present embodiment is described above. Next, exemplary operations and effects thereof are described below.

FIGS. 7A to 7E are side views that illustrate how the connecting wall is gradually deformed by a load applied from the surface portion of the lower garnish when seen from one side direction. FIGS. 8A to 8E are plan views from above illustrating how the connecting wall is deformed in FIGS. 7A to 7E. In FIGS. 7A to 7E and 8A to 8E, the thick arrows indicate a light load (light impact load) applied to the connecting wall 30, and the side wall portion and the inner panel are not illustrated.

For example, if the back of the vehicle 10 is hit by another vehicle from behind the tailgate 14 and a light collision occurs, a light load (see the thick arrows) is applied to the surface portion 22 of the lower garnish 20. The light load is transmitted from the surface portion 22 to the connecting wall 30, and the connecting wall 30 becomes deformed from the intersection of the first slit 38 and the second slit 40 as the starting point.

That is, the first slit 38 at the intersection becomes deformed in the direction in which its slit width gradually increases (the direction in which the gap between the inner walls of the first slit 38 increases). At this time, the second slit 40 at the intersection first becomes deformed in the direction in which the slit width of the lower second slit 40b decreases and the inner walls of the lower second slit 40b move closer to each other (see FIGS. 7A to 7C). Because the lower second slit 40b is set so as to have a slit length longer than the slit length of the upper second slit 40a and have rigidity and strength lower than those of the upper second slit 40a, the lower second slit 40b becomes deformed in advance of the upper second slit 40a. At this time, the second wall portion 42b and the third wall portion 42c of the connecting wall 30 become deformed so as to project upward and downward, respectively, such that the cuts serve as the starting point.

Figure 8A:
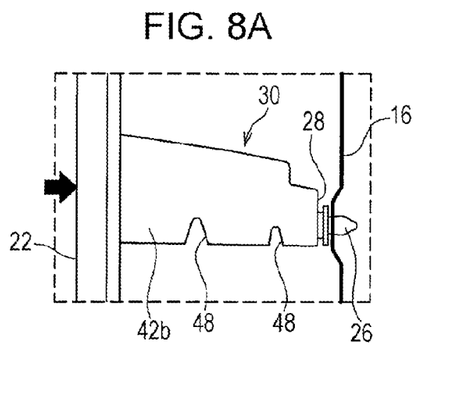
FIGS. 8A to 8E are plan views from above illustrating how the connecting wall is deformed in FIGS. 7A to 7E.
Figure 8B:
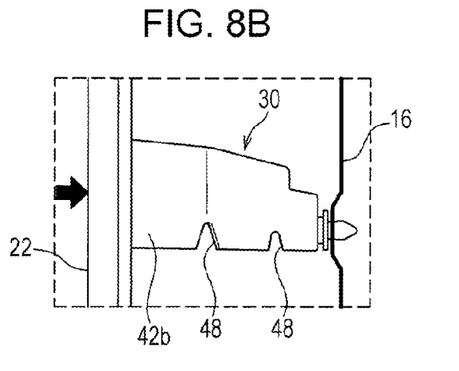
Figure 8C:
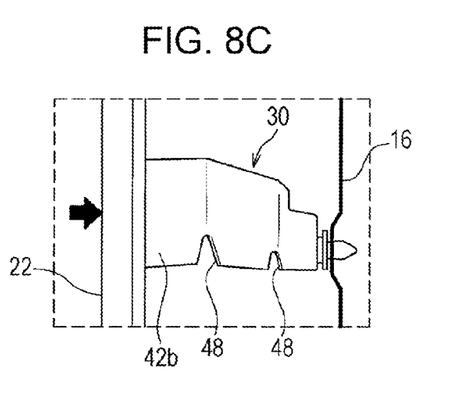
Figure 8D:
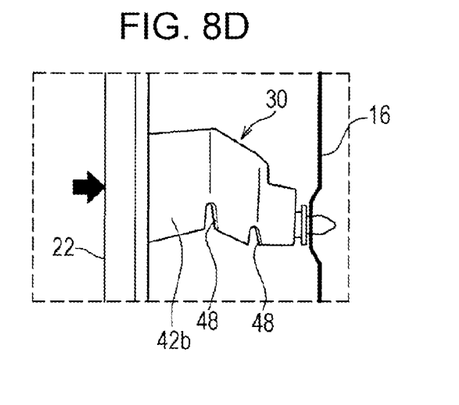
Figure 8E:
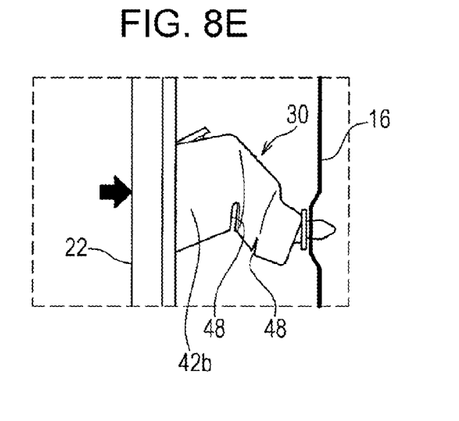

When the deformation state at that time is seen from above, the connecting wall 30 starts being deformed so as to be bent in the direction from the right side toward the left side through the cuts 48, which have a V-shaped cross section and formed in the side edge 46 of each of the second wall portion 42b and the third wall portion 42c (see FIGS. 8A to 8C).

When the light load is further applied to the connecting wall 30, subsequently to the lower second slit 40b, the upper second slit 40a is displaced in the direction in which its slit width gradually diminishes and the inner walls of the upper second slit 40a move closer to each other (see FIG. 7D).

Figure 7A:
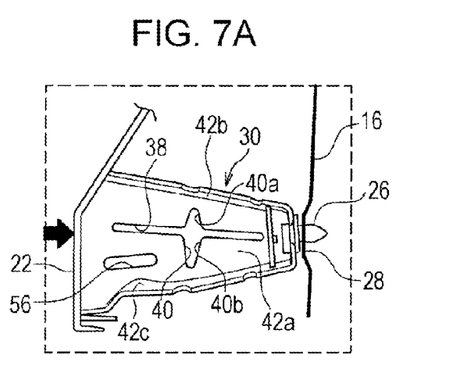
FIGS. 7A to 7E are side views that illustrate how the connecting wall is deformed by a load applied from the surface of the lower garnish.
Figure 7B:
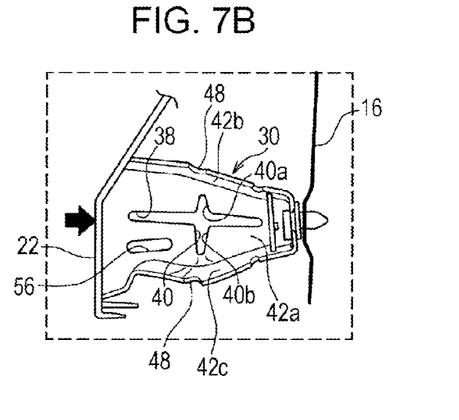
Figure 7C:
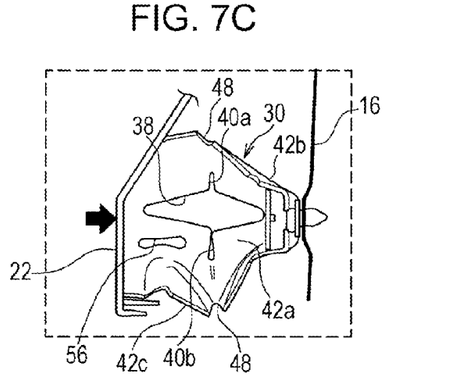
Figure 7D:
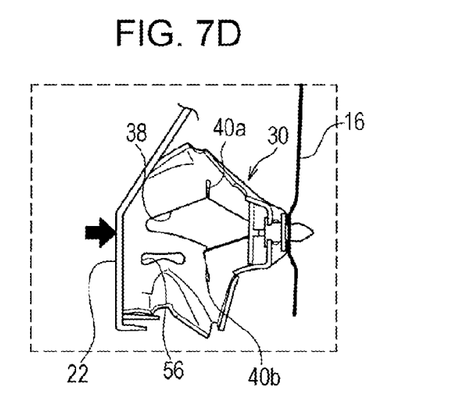
Figure 7E:
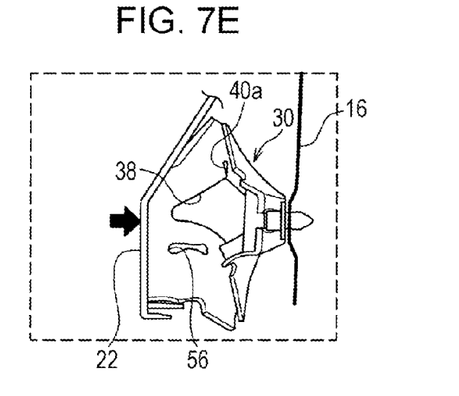

Finally, the horizontally extending first slit 38 is deformed so as to be widened in a substantially diamond shape, and each of the upper second slit 40a and the lower second slit 40b is deformed such that its slit width is zero and the inner walls are in contact with each other (see FIG. 7E). When this deformation state at this time is seen from above, the connecting wall 30 projects in the direction from the right side toward the left side along the cuts 48 extending along the intersection of the first slit 38 and the second slit 40, that is, is significantly bent in a substantially chevron shape (see FIG. 8E).

In the present embodiment, while the surface portion 22 is displaced in the direction in which it becomes closer to the outer panel 16 in response to the application of a light load to the surface portion 22 at the time of a light collision, the connecting wall 30 is deformed in the direction in which the slit width of the first slit 38 at the intersection increases and is also deformed in the direction in which the slit width of the second slit 40 at the intersection decreases (see FIGS. 7C and 7D).

Accordingly, in the present embodiment, when a light load is applied to the lower garnish 20, the connecting wall 30 becomes easily deformed through the first slit 38 and the second slit 40, which intersect each other, and the light load is absorbed, and the transmission of the light load to the outer panel 16 can be reduced and the deformation of the outer panel 16 can be suppressed. As a result, in the present embodiment, when a light load is applied to a decorative member, such as the lower garnish 20, in a light collision, only required is replacement with a new decorative member and the necessity of a steel-metal repair or other suitable repairs of the outer panel 16 can be eliminated, and thus burdens on a user can be reduced. As another embodiment, the connecting wall 30 may be used in a bumper beam functioning as the decorative member so as to absorb a light load.

In the present embodiment, the first slit 38 and the second slit 40 intersecting at right angles enable the first slit 38 to become deformed in the direction in which its slit width increases without becoming deformed on only one side when a light load is applied. This structure may prevent unbalanced deformation from being caused. Unbalance may occur, for example, between the sides of the first slit 38. In addition, in the present embodiment, situations in which, of the upper and lower parts of the first wall portion 42a divided by the first slit 38 in the direction from the surface portion 22 toward the mounting seat 28, only the upper part (one side) comes into contact with the outer panel 16 in advance of the lower part (the other side) can be reduced.

Moreover, in the present embodiment, the substantially wedge shape of each of the upper second slit 40a and the lower second slit 40b can ensure a sufficient amount of deformation of each of the upper second slit 40a and the lower second slit 40b at the intersection in the direction in which the slit width decreases. Additionally, in the present embodiment, the substantially wedge shape enables a part of the connecting wall 30 that contains the second slit 40 to be deformed in the direction in which it becomes apart from the first slit 38.

Furthermore, in the present embodiment, the arrangement of the second slit 40 in a substantially central location in the direction from the surface portion 22 of the connecting wall 30 toward the mounting seat 28 can maximize the amount of deformation occurring when the connecting wall 30 is deformed with the second slit 40 serving as the center.

Furthermore, in the present embodiment, the recess 44 extending along the extending direction of the second slit 40 enables the connecting wall 30 to be bent at the recess 44 as the base point when a light load is applied and enables the connecting wall 30 to be deformed with reliability.

Furthermore, in the present embodiment, the cut 48 extending along the extending direction of the recess 44 facilitates deformation from the recess 44 as the base point, and thus the connecting wall 30 is deformable with more reliability.

Furthermore, in the present embodiment, the open cross section formed by the second wall portion 42b and the third wall portion 42c extending from respective opposite ends of the first wall portion 42a and facing each other at a predetermined distance can ensure a minimum rigidity at which the lower garnish 20 is not deformed by merely a press on the surface portion 22 by a user with a finger and can avoid a decrease in the marketability of the lower garnish 20. In addition, in the present embodiment, while the minimum rigidity is ensured, the second wall portion 42b and the third wall portion 42c can be bent by deformation of the first wall portion 42a and the entire connecting wall 30 can be easily deformed in a light collision. The open cross section may preferably be at least any one of a rectangular U-shaped cross section, a rounded U-shaped cross section, and a semicircular cross section.

Furthermore, in the present embodiment, because the side wall portion 32 and the spaced portion 52 are spaced apart from each other at a predetermined distance such that the gap 50 is disposed therebetween, the side wall portion 32 is not an obstruction to deformation of the connecting wall 30, and the side wall portion 32 can be prevented from interfering with the deformation of the connecting wall 30. In addition, in the present embodiment, connecting the side wall portion 32 and the spaced portion 52 with the base 54 in a region adjacent to the surface portion 22 can enhance the rigidity in the region adjacent to the surface portion 22, enables a light load to be efficiently transmitted to the spaced portion 52, and enables the spaced portion 52 to be easily deformed.

Furthermore, in the present embodiment, the region having the rigidity increased by the base 54 can be efficiently deformed by the third slit 56, which is adjacent to the junction 53 of the spaced portion 52 and the base 54.

Furthermore, in the present embodiment, the arrangement of the side wall portion 32 below the lower end 16b of the outer panel 16 in the top and bottom direction can suitably prevent the side wall portion 32 from coming into contact with the outer panel 16 and enables the connecting wall 30 to be easily deformed when the connecting wall 30 is deformed by the application of a light load.

We claim:

1. A load absorbing structure comprising:
an outer panel that forms an external surface of a vehicle; and
a decorative member arranged outside the outer panel and mounted on the outer panel,
wherein the decorative member includes a surface portion and a mounting portion, the surface portion being spaced apart from the outer panel in an outward direction of the vehicle and extending along an outer surface of the outer panel, the mounting portion being disposed between the outer surface of the outer panel and an inner surface of the surface portion,
the mounting portion includes a mounting seat and a connecting wall, the mounting seat extending along the outer surface of the outer panel and being mounted on the outer panel, the connecting wall connecting the mounting seat and the surface portion, wherein the mounting portion is made of resin material,
the connecting wall includes a first slit and a second slit, the first slit extending along a first direction, the first direction being a front-back direction and directing from the surface portion toward the mounting seat, and the second slit extending in a top-bottom direction and intersecting the first slit,
the mounting seat and the surface portion are each located on an axis of the first slit,
the connecting wall includes a recess extending along an extending direction of the second slit for controlling deformation of the connecting wall, and
wherein each of the first slit and the second slit is a hole passing through the connecting wall from a front surface to a rear surface thereof.

2. The load absorbing structure according to claim 1, wherein the first slit and the second slit intersect each other at right angles.

3. The load absorbing structure according to claim 1, wherein the second slit has a substantially wedge shape such that a slit width of the second slit gradually increases toward the first slit.

4. The load absorbing structure according to claim 1, wherein the second slit is arranged in a substantially central part in the connecting wall in the first direction from the surface portion toward the mounting seat.

5. The load absorbing structure according to claim 1, wherein the connecting wall includes a side edge and a cut in the side edge, the cut extending along an extending direction of the recess.

6. The load absorbing structure according to claim 5, wherein the connecting wall includes a first wall portion, a second wall portion, and a third wall portion, wherein the second wall portion and the third wall portion extend from respective opposite ends of the first wall portion, are spaced apart from each other at a predetermined distance, and face each other such that the connecting wall includes an open cross section, and
the first slit and the second slit are disposed in the first wall portion.

7. The load absorbing structure according to claim 6, wherein the open cross section comprises at least any one of a rectangular U-shaped cross section, a trapezoidal open cross section, a rounded U-shaped cross section, and a semicircular cross section.

8. The load absorbing structure according to claim 1, wherein the decorative member includes a side wall portion extending from the surface portion toward the outer panel, and
the connecting wall includes a spaced portion and a base, the spaced portion extending from the mounting seat toward the surface portion and facing the side wall portion such that a gap is disposed therebetween, the base connecting the spaced portion and the surface portion.

9. The load absorbing structure according to claim 8, wherein the connecting wall includes a third slit, the third slit being disposed in the vicinity of a junction of the spaced portion and the base and extending between the first slit and the junction.

10. The load absorbing structure according to claim 1, wherein the connecting wall is deformed such that the width of the first slit at the intersection increases and the width of the second slit at the intersection decreases, when an external force is applied to displace the surface portion toward the outer panel.

11. The load absorbing structure according to claim 1, wherein the second slit includes an upper second slit and a lower second slit, the upper second slit extending from the intersection of the first slit and the second slit in an upper direction, the lower second slit extending from the intersection in an lower direction, and wherein the lower second slit includes the length longer than the upper second slit.

12. The load absorbing structure according to claim 1, wherein the mounting portion is made of the resin material to be deformed more easily than a material of the outer panel.

* * * * *